(12) United States Patent
Thomas (10) Patent No.: US 12,442,328 B2
(45) Date of Patent: Oct. 14, 2025

(54) PISTON WITH A BIAXIAL BEARING FOR AN OPPOSED-PISTON ENGINE

(71) Applicant: Achates Power, Inc., San Diego, CA (US)

(72) Inventor: Isaac B. Thomas, Carson City, NV (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 18/530,723

(22) Filed: Dec. 6, 2023

(65) Prior Publication Data

US 2024/0191653 A1    Jun. 13, 2024

Related U.S. Application Data

(60) Provisional application No. 63/430,961, filed on Dec. 7, 2022.

(51) Int. Cl.
  *F02B 75/28*  (2006.01)

(52) U.S. Cl.
  CPC .................................. *F02B 75/282* (2013.01)

(58) Field of Classification Search
  CPC .................................................. F02B 75/282
  See application file for complete search history.

(56) References Cited

U.S. PATENT DOCUMENTS

| | | | |
|---|---|---|---|
| 6,120,189 A * | 9/2000 | Beagle | F16C 11/02 384/429 |
| 8,519,015 B2 | 8/2013 | Pinkhassik et al. | |
| 9,175,725 B2 | 11/2015 | Dion et al. | |
| 11,402,020 B2 | 8/2022 | Augustin, Sr. et al. | |
| 2011/0271932 A1 | 11/2011 | Fuqua et al. | |
| 2012/0073526 A1 | 3/2012 | Dion et al. | |
| 2013/0213342 A1 | 8/2013 | Burton et al. | |
| 2014/0014063 A1 | 1/2014 | Redon | |
| 2014/0083396 A1 | 3/2014 | Burton et al. | |
| 2014/0238360 A1 * | 8/2014 | Dion | F16J 1/16 384/155 |
| 2015/0122227 A1 | 5/2015 | Abani et al. | |
| 2015/0128920 A1 | 5/2015 | Kessler et al. | |
| 2016/0186686 A1 * | 6/2016 | Azevedo | F02F 3/003 123/41.38 |
| 2016/0201544 A1 | 7/2016 | MacKenzie et al. | |
| 2016/0290224 A1 | 10/2016 | Abani et al. | |
| 2016/0356308 A1 | 12/2016 | Kessler et al. | |
| 2017/0030262 A1 | 2/2017 | Venugopal | |

(Continued)

FOREIGN PATENT DOCUMENTS

| | | |
|---|---|---|
| WO | 2012158756 A1 | 11/2012 |
| WO | WO 2024/123898 A2 | 6/2024 |

OTHER PUBLICATIONS

Wakuri, Y., et al., "On the Lubrication of Crosshead-pin Bearing with Eccentric Journal" Bulletin of the JSME, vol. 25, No. 206, Aug. 1982, Paper No. 206-17, pp. 1312-1320.

(Continued)

*Primary Examiner* — Kevin A Lathers
(74) *Attorney, Agent, or Firm* — Terrance A. Meador (57) ABSTRACT

A piston is configured to be used in a cylinder bore of an opposed-piston. The piston includes a biaxial bearing. The biaxial bearing includes a biaxial wrist pin with a diameter configured to be less than half the diameter of the cylinder bore.

24 Claims, 5 Drawing Sheets

(56) References Cited

U.S. PATENT DOCUMENTS

2017/0074315 A1\* 3/2017 Kessler .................... F16J 1/16
2020/0191090 A1   6/2020 MacKenzie
2021/0270367 A1   9/2021 Augustin, Sr. et al.

OTHER PUBLICATIONS

Wakuri, Y., et al., "On the Lubrication of Crosshead-pin Bearing with Eccentric Journal" Bulletin of the JSME, vol. 28, No. 243, Sep. 1985, Paper No. 43-46, pp. 2112-2119.
"Internal Combustion Engine Basics", US Department of Energy, Nov. 22, 2013, https://www.energy.gov/eere/vehicles/articles/internal-combustion-engine-basics, downloaded Mar. 5, 2020.
International Search Report and Written Opinion in PCT/US2023/082716, mailed Oct. 31, 2024.

\* cited by examiner

PISTON WITH A BIAXIAL BEARING FOR AN OPPOSED-PISTON ENGINE

STATEMENT OF GOVERNMENTAL RIGHTS

This Project Agreement Holder invention was made with U.S. Government support under Other Transaction Authority (OT) Agreement No. W56HZV-16-9-0001 awarded by the U.S. Army Contracting Command. The Government has certain rights in the invention.

TECHNICAL FIELD

This specification relates to pistons for opposed-piston internal combustion engines. In certain instances, this specification concerns biaxial bearings of such pistons.

BACKGROUND

Pistons of opposed-piston internal combustion engines are constructed differently from conventional pistons that form combustion chambers against a cylinder head. This is true particularly in a two-stroke opposed-piston engine in which a combustion chamber is formed between the crowns of two pistons as they move in mutually opposing directions in a cylinder of the engine. Side injection of fuel into the cylinder, transverse to the crowns, necessitates uniquely-shaped bowls that entrain fuel and air as the pistons approach one another to form the combustion chamber. Additionally, the movements of the opposed-pistons open and close respective longitudinally separated cylinder ports which allow charge air and exhaust to flow through the cylinder, thus requiring a greater length for each of the opposed-pistons than for a conventional piston, as well as an additional ring band rearwardly of the crown.

Configurations of pistons for use in opposed-piston engines commonly include bearing designs that enable interconnection of a connecting rod, a wrist pin, and a piston body. Bearing design is a known challenge. One solution for opposed-piston engines is described in US 2014/0238360. It includes a rocking journal bearing that provides biaxial rotation of the wrist pin, which separates bearing parts to allow introduction of oil between the bearing surfaces. A rocking journal bearing may also be referred to as a "biaxial bearing", or a "multiaxial bearing". In this specification, such a bearing will be called a "biaxial bearing".

Biaxial bearings have shown promise in solving issues of lubrication in compression-ignition, two-stroke, opposed-piston engines operating under high loads and peak cylinder pressures (which can approach, or exceed, 175 bar). However, when the methodology used to design the biaxial bearings includes an assumption that the wrist pin and bearing behave rigidly as the engine operates, a resulting design model indicates high film pressures concentrated largely near a central portion of the bearing. Consequently, a conventional biaxial bearing has a very large wrist pin diameter in order to manage the peak oil film pressure. This configuration can pose challenges to packaging the piston body.

One compromise involves a weldment with which a crown is attached to a piston skirt in the construction of a piston body. Due to the short distance between the crown and a bore within which the wrist pin is disposed, the weld seam is short and experiences significant bending and shearing stress in the weld plane. As a result, the weld seam needs to be thickened to handle the stress. This limits the height of an undercrown cooling galley in a peripheral zone of the crown between the end surface of the crown, which reduces the ability of the gallery to cool the top land and upper ring band of the piston.

The large wrist pin diameter also poses a challenge to piston skirt compliance, a factor for piston robustness against scuffing. With the large wrist pin diameter, there is reduced room to add in compliance features such as thin-walled panels between the skirt running zone and the wrist pin bosses which would "disconnect" the deformation of the skirt from deformation of bosses within the piston body which support the wrist pin.

Additionally, due to a short, wide, and stiff weld seam, and the lack of panels between the skirt and wrist pin bosses, crown thermal deformation can result in significant bulging of the skirt running zone in the thrust plane of the piston, in addition to thermal arching of the pin bore. This requires larger piston-bore clearances which can increase piston-cylinder contact pressures and wear loads. The weld seam stiffness can also result in increased arching of the wrist pin bore, resulting in poor distribution of oil film pressure and excessive edge loading of the wrist pin bearing.

A large biaxial wrist pin diameter requires greater axis offsets between journal segments to enable adequate lubricant filling, as a larger volume of oil is required to fill the gap. One consequence of this is that the clearance hole in the wrist pin bore needs to be large enough for the wrist pin to be installed. This drives increased back-clearance between the wrist pin and wrist pin bosses. During overspeed conditions and/or low boost conditions, the impact forces at load reversal can drive very high stresses into wrist pin bosses, which poses a design challenge and necessitates increased mass.

Yet another compromise involving a large wrist pin diameter is that there is little wall thickness on the wrist pin bore to transmit firing loads to the biaxial bearing. As a result of the large diameter and piston compliance, loads on the bearing are poorly distributed. This results in a tendency for high loading on the edges of the bearing shell.

A further tradeoff involves distribution of the load borne by the biaxial bearing. Implicit in the rigidity assumption is concentration of the load in the central portion of the bearing, which results in about half of the total bearing area being allocated to a central segment, with the remainder being distributed among lateral segments which flank the central segment.

SUMMARY

According to embodiments to be described, this specification provides a piston apparatus comprising a generally cylindrical piston body configured to slide in an opposed-piston engine cylinder having a cylinder bore diameter ($D_1$). The piston body includes a biaxial bearing structure configured to define a biaxial wrist pin diameter ($D_2$). In a general aspect, the diameter of the biaxial wrist pin can be less than half the diameter of the cylinder bore; that is to say, $D_2 < 0.5 D_1$. In an example, the biaxial wrist pin can have a diameter between approximately 30%-45% of the diameter of the cylinder bore; in other words, $0.3 D_1 \leq D_2 \leq 0.45 D_1$.

Using a cylinder bore diameter as a limiting measure affords definition of a reduced diameter of the wrist pin of a biaxial bearing in a piston of a two-stroke opposed-piston engine. Commonly, a diameter of a biaxial wrist pin of an opposed-piston engine is approximately ½ the diameter of the cylinder bore for which the piston is designed. Reduction of the wrist pin diameter to less than half of the cylinder bore diameter permits optimization of the stiffness characteristics of the piston and wrist pin, which, in turn, permits utilization of more of the wrist pin's bearing area to support expected firing loads.

Various embodiments can include some or all of the following features. A piston apparatus can include a generally cylindrical piston body including a crown attached to a skirt. The crown can include a bowl configured to form a combustion chamber in a cylinder of an opposed-piston engine. Such a combustion chamber can be formed between the crown and an opposing crown of another piston as the pistons move toward each other in the cylinder. The piston body can be generally configured to be used in a cylinder of an opposed-piston engine in which a cylinder bore diameter ($D_1$) can be defined. The piston body can include a biaxial bearing structure configured to define a biaxial wrist pin diameter ($D_2$). In general, the biaxial wristpin diameter ($D_2$) is less than one half the cylinder bore diameter ($D_1$), in magnitude. In a general aspect, $D_2 < 0.5 D_1$. In an example, $0.3 D_1 \leq D_2 \leq 0.45 D_1$.

The diameter $D_1$ can be an inner diameter of a cylinder bore or an outer diameter of the piston body. The diameter $D_2$ can be an outer diameter of a wrist pin bore, a first wrist pin journal segment, or a second wrist pin journal segment; the diameter $D_2$ can be an inner diameter of a first wrist pin bearing surface segment, or a second wrist pin bearing surface segment.

Generally, the magnitudes of the piston body dimensions, $D_1$ and $D_2$, and the disclosed size relationships between these dimensions, are determined when the described piston apparatus is at rest, with a stable, ambient temperature, unexposed to thermal effects which would be generated by operation of the opposed-piston engine.

Although the drawings represent embodiments of various features and components according to this specification, they are not necessarily to scale and certain features may be exaggerated in order to better illustrate and explain this disclosure. The examples set out herein illustrate embodiments of the disclosure and should not be taken as limiting the scope of the disclosure in any manner not explicitly expressed.

DETAILED DESCRIPTION

The piston apparatus configurations described herein are variations of piston designs for two-stroke opposed-piston engines that include modifications such as integration of the structure and functionality of a biaxial bearing into parts of the piston body for optimized piston construction. Other changes in piston design and performance may also be described.

A two-stroke cycle engine is an internal combustion engine that completes an operating cycle with a single complete rotation of a crankshaft and two strokes of a piston connected to the crankshaft. One example of a two-stroke cycle engine is an opposed-piston engine in which two pistons are disposed in opposition in the bore of a cylinder. During engine operation, combustion takes place in a combustion chamber formed in the bore between the end surfaces of the two pistons when the pistons move toward each other in the bore, during a compression stroke.

Figure 1:
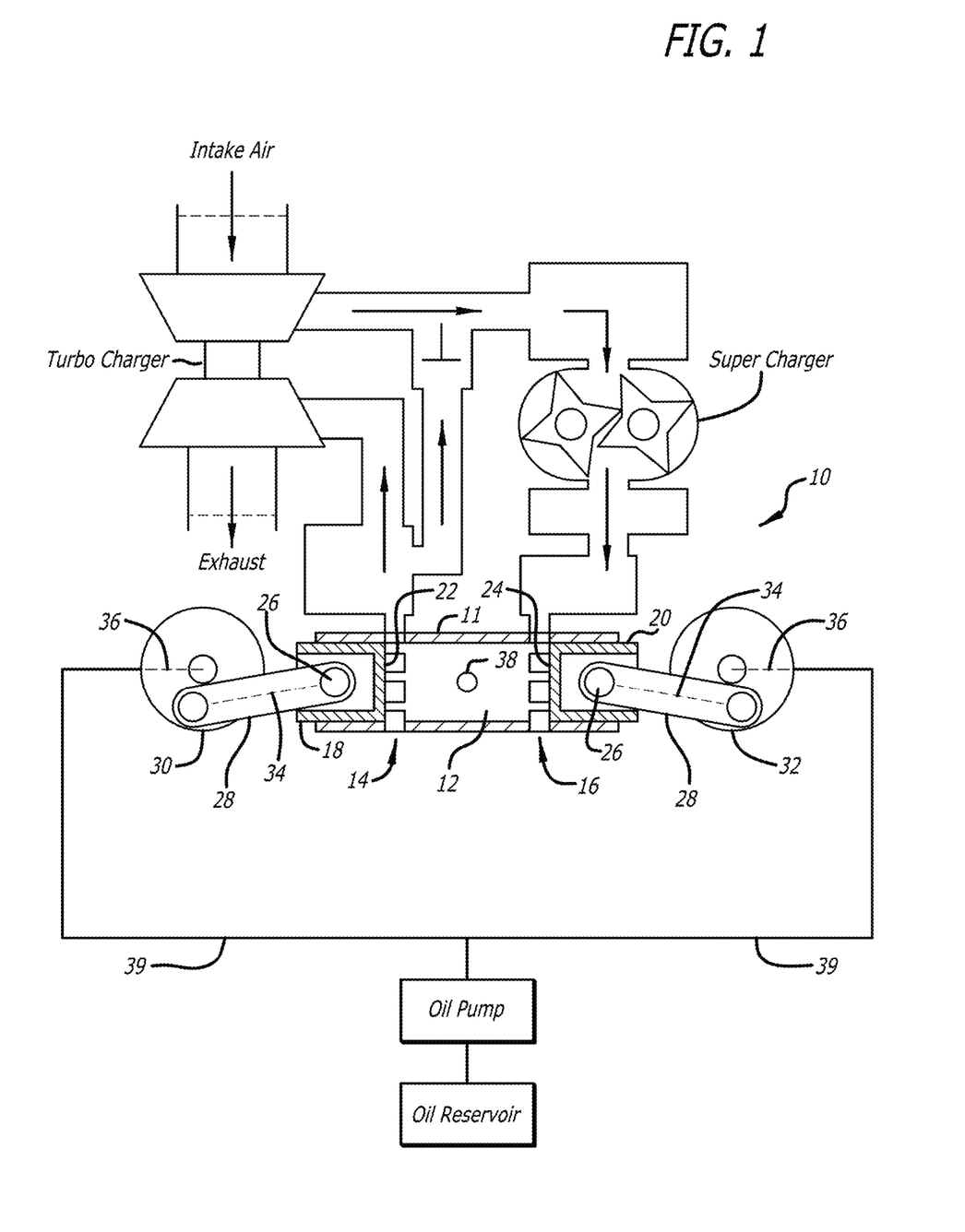
FIG. 1 depicts an example of an opposed-piston engine.

A representative two-stroke cycle engine is embodied in the opposed-piston engine 10 of FIG. 1. The opposed-piston engine 10 has at least one ported cylinder 11. For example, the engine may have one ported cylinder, two ported cylinders, three ported cylinders, or four or more ported cylinders. For purposes of illustration, the engine 10 is presumed to have a plurality of ported cylinders. Each cylinder 11 has a bore 12. Exhaust and intake ports 14 and 16 are formed in respective ends of the cylinder such that the exhaust port 14 is longitudinally separated from the intake port 16. Each of the exhaust and intake ports 14 and 16 includes one or more circumferential arrays of port openings. Exhaust and intake pistons 18 and 20 are slidably disposed in the bore 12 with their end surfaces 22 and 24 opposing one another. The exhaust pistons 18 are coupled to a crankshaft 30, and the intake pistons 20 are coupled to a crankshaft 32. Each of the pistons is coupled to its associated crankshaft by a bearing assembly 26 and a connecting rod 28. For this disclosure, a cylinder may comprise a boring or a formed space in a parent block, or a liner (or sleeve) retained in a tunnel in an engine block.

In the engine 10, a lubrication system that supplies oil to lubricate moving parts includes an oil reservoir from which pressurized oil is pumped by an oil pump to a main gallery 39. The main gallery 39 supplies pressurized oil to the crankshafts 30 and 32, typically through drillings 36 to the main bearings (not seen). From grooves and/or passageways in the main bearings, pressurized oil is provided to grooves in the big end bearings of the connecting rods 28. From there, pressurized oil flows through passageways 34 in the connecting rods to the bearings 26. In some aspects, which are not intended to be limiting, the engine 10 can be equipped with an air management system that may include either or both of a supercharger and a turbocharger.

The operational cycle of an opposed-piston engine according to FIG. 1 is well understood. In response to combustion occurring between their end surfaces 22, 24, the opposed pistons 18, 20 move away from respective top center (TC) locations in the cylinder in a power stroke. While moving from TC, the pistons keep their associated ports closed until they approach respective bottom center (BC) positions. The pistons may move in phase so that the exhaust and intake ports 14, 16 open and close in unison; alternatively, one piston may lead the other in phase, in which case the intake and exhaust ports have different opening and closing times. As the pistons move through their BC locations exhaust products flowing out of the exhaust port 14 are replaced by charge air flowing into the cylinder through the intake port 16. After reaching BC, the pistons reverse direction in a compression stroke and the ports are again closed by the pistons. While the pistons continue moving toward TC, the charge air in the cylinder 11 is compressed between the end surfaces 22 and 24. Each end surface is shaped for forming a combustion chamber with the adjacent end surface of the opposing piston. See, for example, other piston end surface constructions described and illustrated in US publication 2011/0271932, US publication 2013/0213342, WO publication 2012/158756, US publication 2014/0014063, US publication 2015/0122227, US publication 2016/0290224, and US publication 2017/0030262. As the pistons advance to their respective TC locations in the cylinder bore, fuel is injected through the nozzles 38 into the charge air, and the mixture of charge air and fuel is compressed in the combustion chamber formed between the end surfaces 22 and 24 of the pistons 18 and 20. When the mixture reaches an ignition temperature, the fuel ignites. Combustion results, driving the pistons apart in another power stroke, toward their respective BC locations.

Due to the nature of the two-stroke cycle, a load reversal on a journal bearing of a two-stroke, opposed-piston engine may never occur during the normal speed and load range operation of the engine, or the duration of a load reversal might be relatively short. In these circumstances, it can be difficult to replenish the bearing with oil. Furthermore, given limited angular oscillation of the bearing, oil introduced between the bearing surfaces may not completely fill the bearing. Eventually the bearing can begin to operate in a boundary layer lubrication mode, which can lead to excess friction, wear, and possible bearing failure.

In FIG. 1, the bearings 26 are continuously subjected to non-reversing, compressive loads during operation of the engine 10. A solution to the problem of non-reversing compressive loads for two-stroke cycle, opposed-piston engines can include biaxial bearings, which can be incorporated into the engine 10 of FIG. 1. In this regard, each bearing assembly 26 can be configured as a biaxial bearing.

Figure 2:
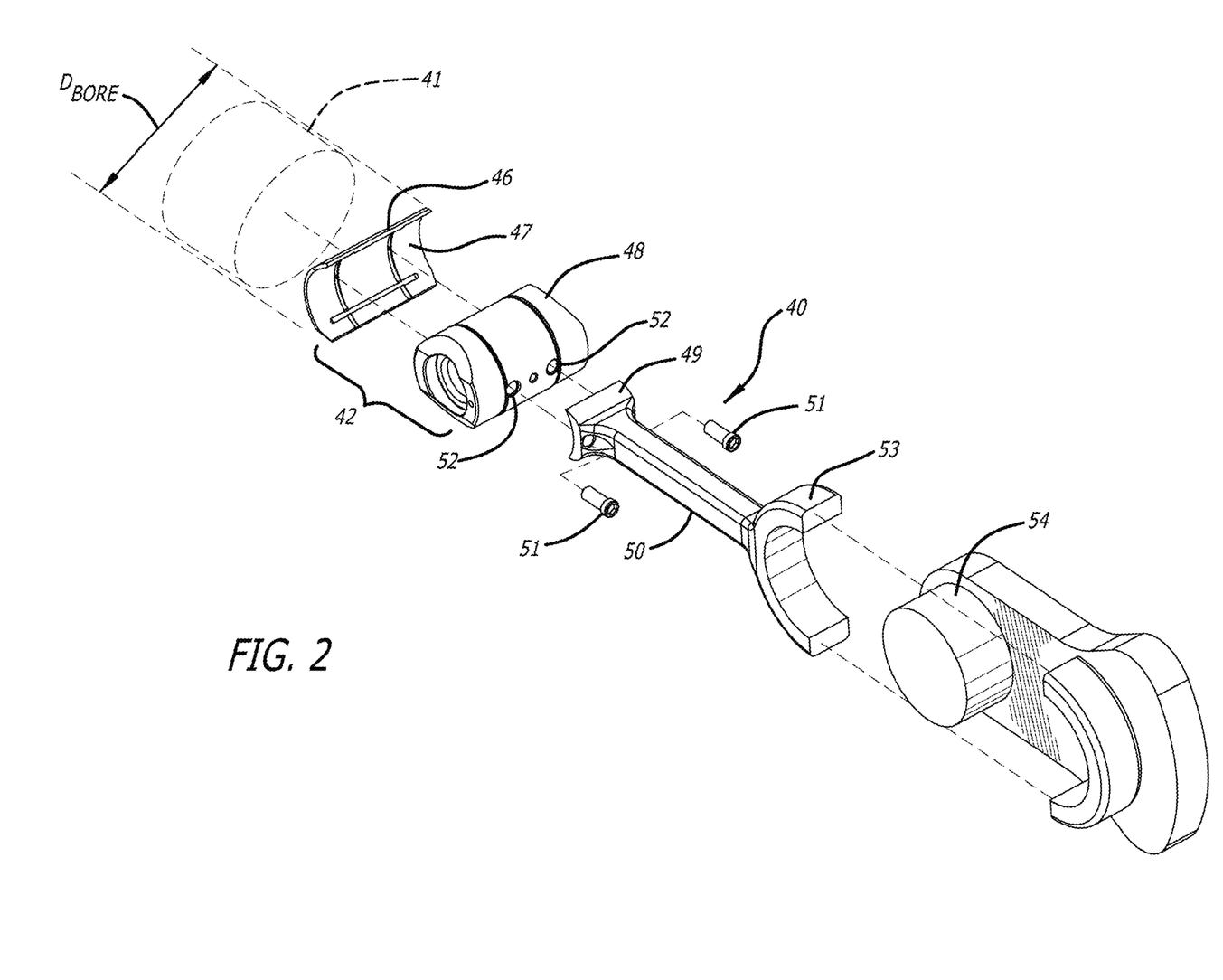
FIG. 2 depicts an exploded view of a biaxial bearing mechanism.

Referring to FIG. 2, a linkage structure 40 couples a piston 41 to a crankshaft by means of a biaxial bearing 42 including a bearing piece 46 having a bearing surface 47 and a wrist pin 48. The bearing piece 46 can be a sleeve (as illustrated), a saddle, or a saddle with separate bearing surface segments (also called "journals") attached thereto. The wrist pin 48 can be retained on the small end 49 of a connecting rod 50 by threaded fasteners 51 for rocking oscillation on the bearing surface 47 of the sleeve 46. The large end 53 of the connecting rod 50 is secured to an associated crankpin 54 of a respective one of the crankshafts 30, 32. Rocking oscillation occurs between the wrist pin 48 and sleeve 46.

The biaxial bearing 42 is received and supported in a body of the piston 41 in such a manner as to enable relative rotation between the wrist pin 48 and the bearing surface 47. The sleeve 46 can be attached to or formed with the internal structure of the piston 41. As per the example shown in FIG. 2, the sleeve can be retained in a wrist pin bore of the piston 41 configured to enable rotation of the wrist pin 48 on the against the bearing surface 47. Other piston constructions with biaxial bearing structures are described and illustrated in US publication 2012/0073526, US publication 2014/0238360, US publication 2015/0128920, US publication 2016/0201544, US publication 2016/0356308, US publication 20200191090, and US publication 2021/0270367.

Figure 3:
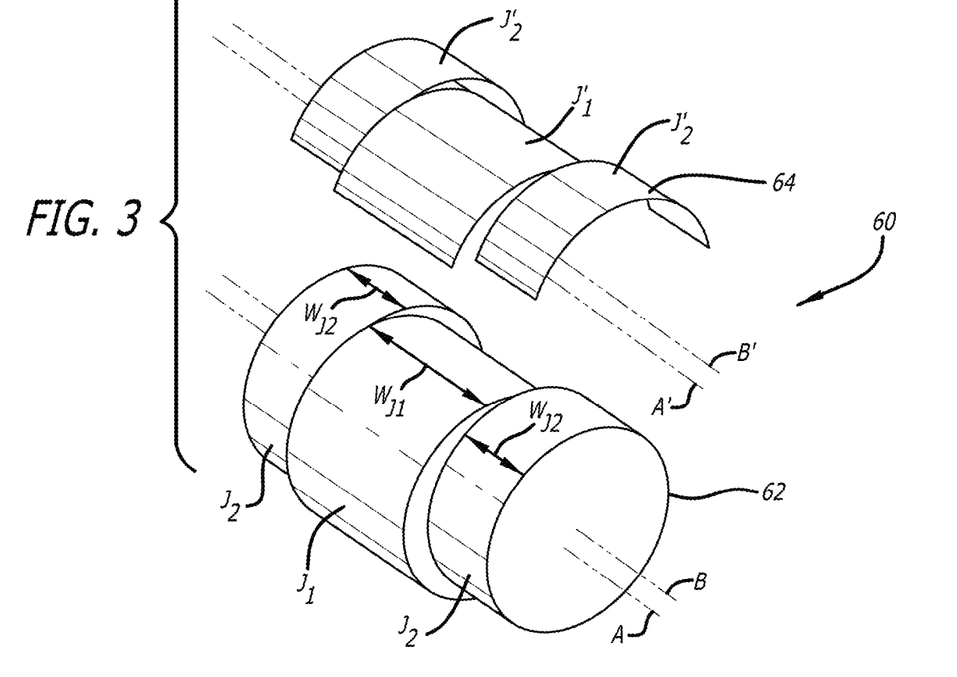
FIG. 3 depicts a diagram showing elements of a conventional biaxial bearing.

As seen in FIG. 3, a conventional biaxial bearing 60 has a construction which includes a biaxial wrist pin 62 and biaxial bearing elements 64. The biaxial wristpin 62 can comprise a generally cylindrical piece with a plurality of axially spaced, eccentrically disposed journal segments. A first journal segment J1 comprises a cylindrical section formed in an intermediate portion of the biaxial wrist pin 62, between two journal segments J2. The two journal segments J2 comprise respective cylindrical sections formed on opposite ends of the wrist pin, which flank the journal segment J1. The journal segment J1 has an axis A. The journal segments J2 share an axis B that is offset from the axis A. In some instances, the outside diameters of the J1 and J2 journal segments are equal.

Per FIG. 3, the biaxial bearing element 64 can comprise a sleeve with a bearing surface that includes a plurality of axially spaced, eccentrically disposed surface segments. A first surface segment J1' comprises an arcuately-shaped (semicircular) bearing surface in an intermediate portion of the sleeve, between two surface segments J2'. The two surface segments J2' comprise arcuately shaped (semicircular) bearing surfaces formed at opposite ends of the sleeve, on respective sides of the surface segment J1'. The arcuate surface segment J1' has an axis A'. The arcuate surface segments J2' share an axis B' that is offset from the axis A' of surface segment J1'. As per FIG. 2, the biaxial wrist pin 62 can be mounted to the small end of a connecting rod and the sleeve can be mounted to an internal structure of a piston, such that corresponding bearing segment sets J1-J1' and J2-J2' are in opposing contact. The arcuate shapes of the surface segments J1' and J2' correspond to generally circular cylinders having inner diameters that are mutually equal and are also equal to the diameters of the journal segments of the biaxial wrist pin 62.

In operation, as the piston to which they are mounted reciprocates between TC and BC positions, oscillatory rocking motion between the biaxial wrist pin 62 and the sleeve 64 causes the bearing interfaces J1-J1' and J2-J2' to alternately receive the compressive load. The bearing surface segments receiving the load come together and the bearing surface segments being unloaded separate. Separation enables a film of oil to enter space between the separating bearing surfaces. During one full cycle of the two-stroke cycle engine, this point is traversed twice by each piston, once when the piston moves from TC to BC (that is to say, during the power stroke), and again when the piston moves from BC to TC (during the compression stroke). The assumption of rigidity in conventional biaxial bearing design methodology indicates that the load is carried only by the J1 journal or the J2 journal, except for a few degrees of crank angle around where the load is transferred from J1 to J2. Thus bearing sizing is driven by assumption that the load is only carried by one bearing journal (J1 or J2) at any given time.

Figure 4:
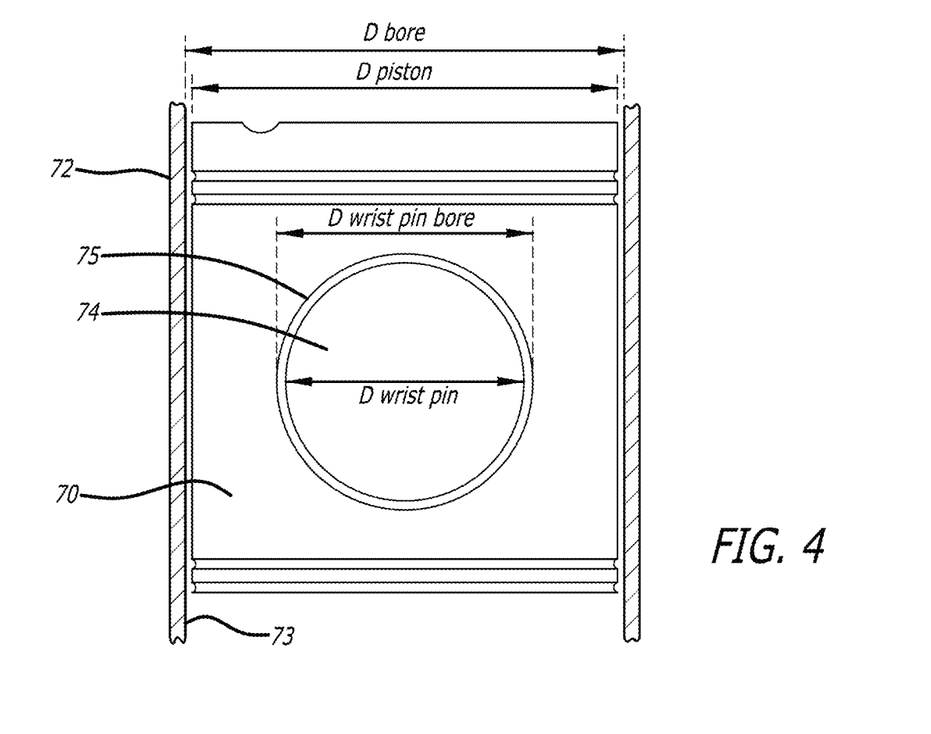
FIG. 4 is a diagram showing an example of a piston with a biaxial bearing disposed in a cylinder of an opposed-piston engine.

Two construction features can be used to characterize a biaxial bearing configured for use in a piston of an opposed-piston engine: a diameter of the wrist pin and journal segment width. FIG. 4 illustrates a piston 70 of an opposed-piston engine, which incorporates a conventional biaxial bearing as per FIGS. 2 and 3. The piston 70 is disposed in a cylinder 72 of an opposed-piston engine. The cylinder 72 has a bore 73 with an inner diameter ($D_{bore}$). The piston 70 has a conventional biaxial bearing with a biaxial wrist pin 74 supported in a wrist pin bore 75 defined by bosses internal to the piston 70. The biaxial wristpin 74 has an outer diameter ($D_{wristpin}$) which is at least one half the diameter ($D_{bore}$) of the bore 73. For example, in a medium- or a heavy-duty application, a typical opposed-piston cylinder may have a bore diameter of 130 mm, in which a piston may have a conventional biaxial bearing with a wrist pin diameter of 66 mm.

Various dimensions of a biaxial bearing structure which relate to the wrist pin 74 can be useful in determining a wrist pin diameter for comparison to a cylinder bore diameter. These dimensions can include any one of the outer diameter of the J1 journal segment, the outer diameter of the J2 journal segments, the inner diameter of a circular cylinder corresponding to the J1' surface segment, the inner diameter of a circular cylinder corresponding to the J2' surface segments, and the inner diameter ($D_{wristpinbore}$) of the wrist pin bore 75.

Dimensions which can establish a cylinder bore diameter with which a biaxial wrist pin diameter can be compared include the bore diameter ($D_{bore}$) of a parent block cylinder or a cylinder liner, and an outer diameter of a body of a piston ($D_{piston}$) designed to slide in the cylinder bore.

Each journal segment is configured with a width, measured axially, from end to end. FIG. 3 illustrates a relationship between the widths, ($W_{J1}$) and ($W_{J2}$), of the J1 and J2 journal segments (and between the corresponding widths of the J1' and J2' surface segments) which accompany a biaxial wrist pin diameter. In this regard the entire bearing width ($W_{bearing}$) of a biaxial bearing comprises the width of the J1 journal segment plus the widths of the two J2 journal segments, that is to say ($W_{bearing}$)=($W_1+W_{J2}+W_{J2}$). In one instance of a conventional biaxial bearing, the assumption that most of the force of compression acts against a central portion of the biaxial wrist pin leads to a "central journal" segment that occupies 70-80% of the entire bearing width, (Wakuri, Y., et al., "On the Lubrication of Crosshead-pin Bearing with Eccentric Journal" Bulletin of the JSME, Vol. 25, No. 206, August 1982, Paper No. 206-17, pp. 1312-1320); in another instance of a conventional biaxial bearing, the central journal segment occupies 65-75% of the entire bearing width, (Wakuri, Y., et al., "On the Lubrication of Crosshead-pin Bearing with Eccentric Journal" Bulletin of the JSME, Vol. 28, No. 243, September 1985, Paper No. 43-46, pp. 2112-2119). In both references the "central journal" segment corresponds to the J1 journal segment of the biaxial wrist pin 60. In the instance of a conventional biaxial bearing, the rigidity assumption leads to a J1 segment of the biaxial wrist pin that occupies about 50% of the total bearing area.

The piston 70 of FIG. 4 is constructed with a biaxial bearing. It is configured to be slidably disposed in a cylinder 72 of an opposed-piston engine, in opposition to another piston (not shown). The cylinder 72 has a bore. A diameter ($D_{Bore}$) represents the inner diameter of the bore. The piston 70 has a generally cylindrical piston body in which a conventional biaxial bearing is configured to define a biaxial wrist pin diameter ($D_{Wristpin}$), wherein, ($D_{Wristpin}$)≥0.5 ($D_{Bore}$). For example, the diameter of the bore ($D_{Bore}$) can be about 130 mm and the biaxial wrist pin diameter ($D_{Wristpin}$) can be about 66 mm, in which case, the wrist pin diameter is a 51% of the bore diameter.

In conventional biaxial bearings, a large wrist pin diameter (at least one half the cylinder bore diameter) is primarily driven by oil film pressure limits, piston diameter, and peak cylinder pressures. Peak oil film pressure was determined assuming the wrist pin and bearing behaved rigidly, which resulted in high film pressures. The rigidity assumption underlying the large wrist pin diameter of the conventional biaxial bearings failed to account for the fact that thermal and mechanical stresses encountered during operation of an opposed-piston engine can cause each piston to flex. Accounting for flexibility of the biaxial bearing and the piston structure led to the realization that the oil film pressure can be much lower than if the biaxial bearing is assumed to be rigid. In this regard, the biaxial bearing structure deforms and potentially distributes the bearing contact over a larger area, reducing the peak oil film pressure. Thus, a reduced biaxial wrist pin diameter can enable reduction of the biaxial wrist pin diameter and elongation of the bearing interface, thereby more evenly distributing the load over the bearing area and reducing peak oil film pressure. Additionally, during peak loading, due to the flexure of the wrist pin and pin bore, the oil film pressure can potentially be distributed over both the J1 and J2 journals. This can serve to further reduce peak film pressure by distributing the load over a larger area, and thus allow a smaller wrist pin diameter.

Figure 5:
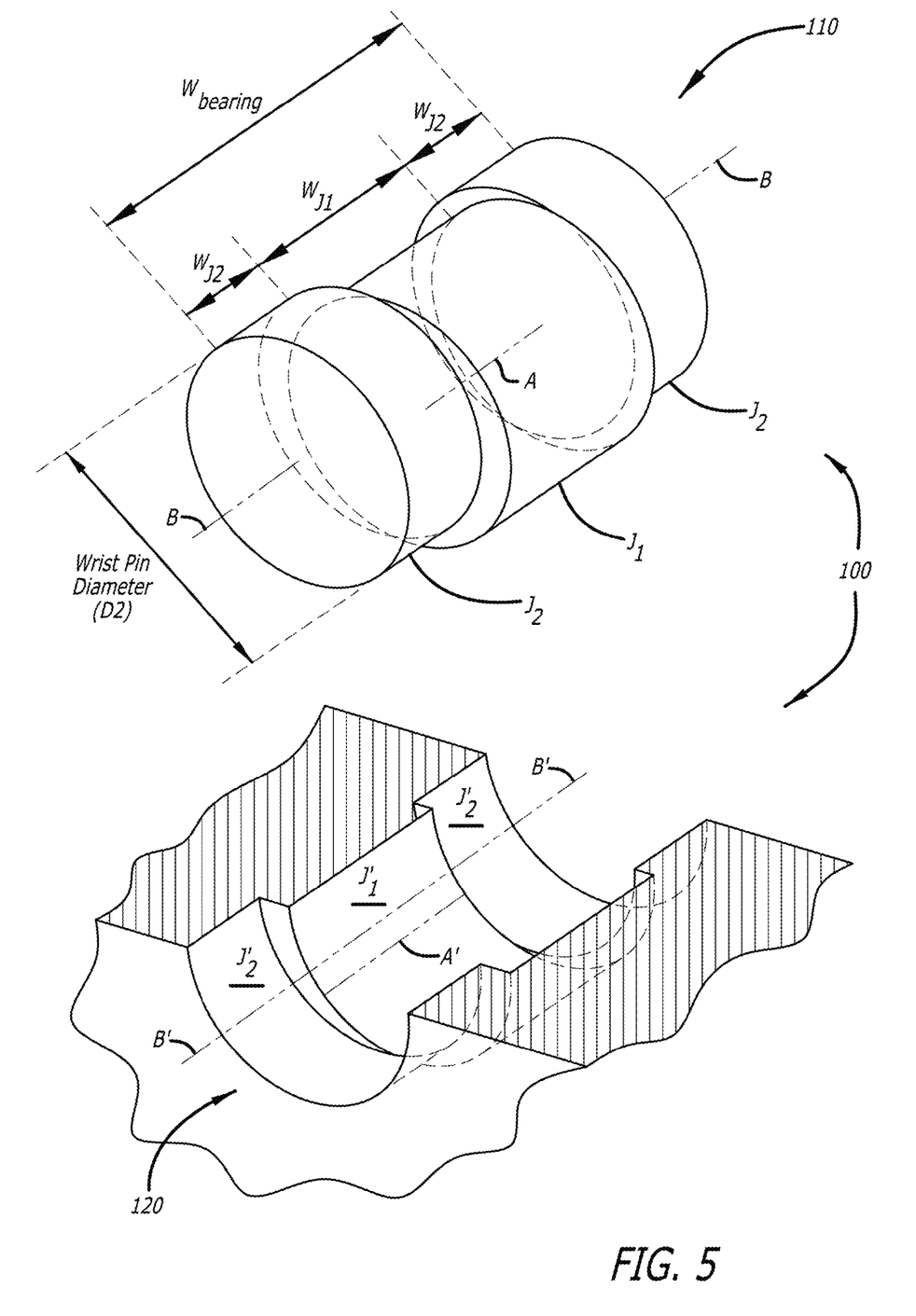
FIG. 5 is a diagram showing dimensions of a conventional biaxial bearing used in a piston of an opposed-piston engine.

The following description shows a detailed construction of a biaxial bearing with a reduced biaxial wrist pin diameter used in a piston of an opposed-piston engine having a cylinder with a bore. In FIG. 5, an example biaxial bearing 100 has a construction in which a biaxial wrist pin 110 comprises a generally cylindrical piece with a plurality of axially spaced, eccentrically disposed journal segments. A first journal segment J1 comprises a cylindrical section formed in an intermediate portion of the wrist pin 110, between two journal segments J2. The two journal segments J2 comprise respective cylindrical sections formed on opposite ends of the biaxial wrist pin, which flank the journal segment J1. The journal segment J1 has an axis A. The journal segments J2 share an axis B that is offset from the axis A. The outside diameters of the J1 and J2 journal segments are equal, either one thereby defining a wrist pin diameter ($D_2$) which is constrained to be less than one half of the diameter of the bore of the cylinder, such that ($D_2$)<0.5($D_1$). The J1 journal segment has a width ($W_{J1}$) and each of the J2 journal segments has a width ($W_{J2}$). The biaxial bearing has a width ($W_{bearing}$), in which ($W_{bearing}$)= ($W_{J1}$)+($W_{J2}$)+($W_{J2}$). The width of the J1 journal segment is constrained to be 40% or less than the width of the biaxial bearing; that is, ($W_{J1}$)≤0.4 ($W_{bearing}$).

The biaxial bearing 100 can comprise a semi-cylindrical piece 120 (a sleeve, for example) with a bearing surface that includes a plurality of axially spaced, eccentrically disposed surface segments. A first surface segment J1' comprises an arcuately shaped (semicircular) bearing surface in an intermediate portion of the sleeve, between two surface segments J2'. The two surface segments J2' comprise arcuately-shaped (semicircular) bearing surfaces formed at opposite ends of the sleeve, on respective sides of the surface segment J1'. The arcuate surface segment J1' has an axis A'. The arcuate surface segments J2' share an axis B' that is offset from the axis A' of surface segment J1'. The wrist pin 110 and the sleeve 120 can be mounted to an internal structure of a piston (not shown), such that corresponding bearing segment sets J1-J1' and J2-J2' are in opposing contact. The arcuate shapes and dimensions of the surface segments J1' and J2' correspond to those of the journal segments of the wrist pin 110.

Figure 6:
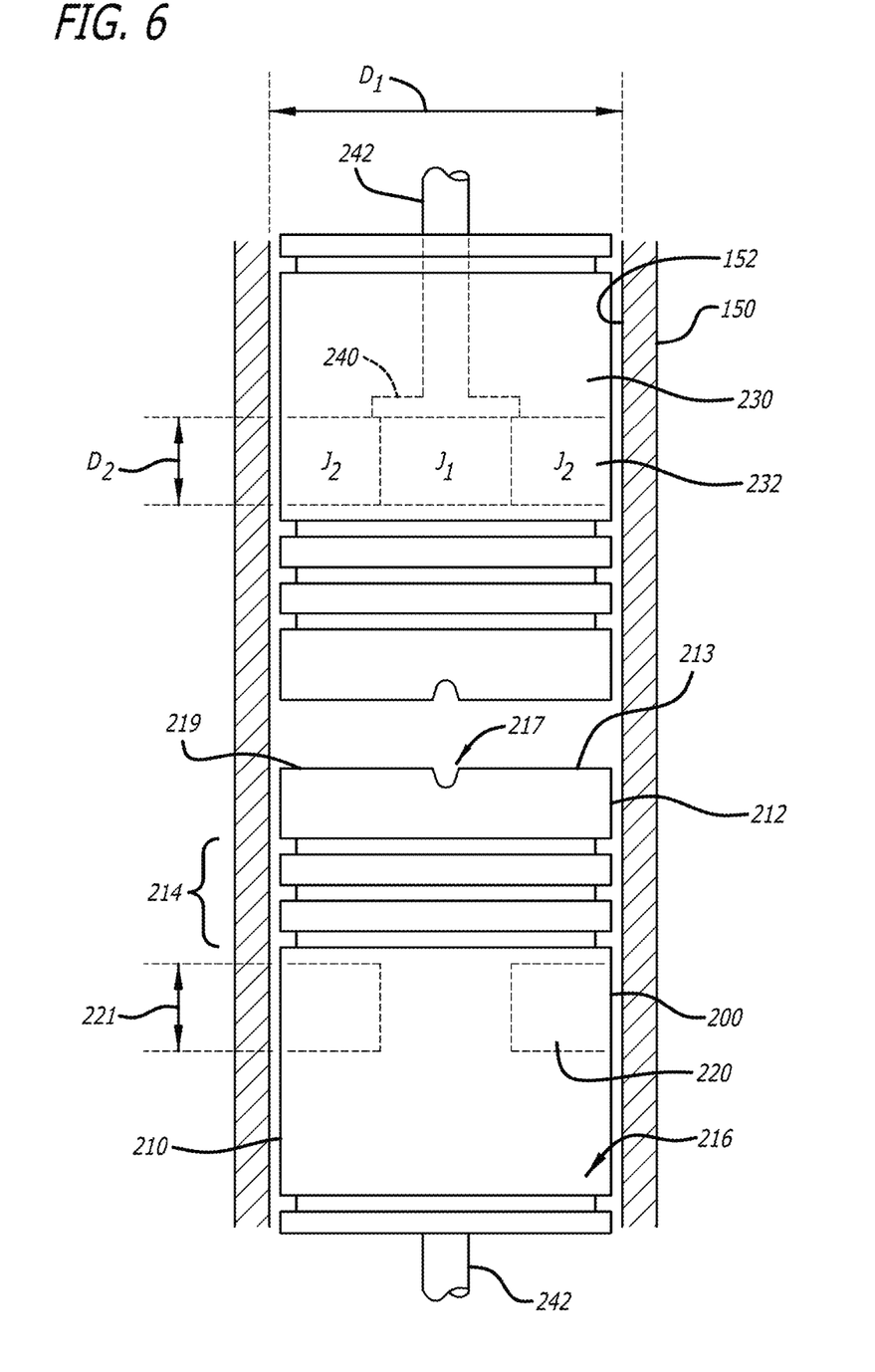
FIG. 6 is a diagram showing an example of pistons in an opposed-piston engine, in which each piston is configured with a biaxial bearing according to FIG. 5.

The following description shows a detailed construction of a piston configured to use a biaxial bearing with a reduced biaxial wrist pin diameter. FIG. 6 is a diagram showing an example of a piston in an opposed-piston engine, in which the piston is configured with a biaxial bearing according to FIG. 5. In FIG. 6, reference numeral 150 indicates a cylinder wall of a two-stroke cycle opposed-piston engine, 152 indicates a bore of the cylinder, 200 indicates a first piston disposed in the cylinder bore 152, and 230 indicates a second piston disposed in the cylinder bore 152 in opposition to the first piston 200. The cylinder bore 152 has a diameter ($D_1$).

Features common to both of the pistons 200 and 230 are described with respect to the first piston 200, with the understanding that the piston 230 comprises these features as well. Reference numeral 210 indicates a generally tubular body of the piston 200, which is capped at one end by a crown 212. The crown 212 comprises an end surface 213, which is configured to form a combustion chamber with the end surface of the piston 230. The crown 212 comprises a side surface including an annular ring belt region 214 in which at least one ring groove is formed. Typically, although not necessarily, there is a plurality of ring grooves in the ring belt region; three such ring grooves are shown as an example. Taking the crown 212 as the top of the piston 200, the ring belt region 214 is referred to as the top ring belt region. The piston 200 has a lower ring belt region 216. An injector trench 217 opens through a peripheral edge 219 of the crown to a bowl (not seen) in the end surface of the crown. The piston body 210 includes a wristpin boss arrangement 220 configured to support a biaxial wrist pin. The wristpin boss arrangement can define a wrist pin bore with a bore diameter 221.

Additional features common to both of the pistons 200 and 230 are described with respect to the second piston 230, with the understanding that the piston 200 comprises these features as well. The second piston 230 includes a biaxial bearing with a biaxial wristpin 232 linking together the small end 240 of a connecting rod 242 with the piston 230. The biaxial wrist pin has a diameter ($D_2$), which is constrained to be less than half of the cylinder bore diameter ($D_1$), that is, ($D_2$)<0.5($D_1$). For example, the bore diameter ($D_1$) can be about 130 mm, and the wrist pin diameter ($D_2$) can be about 60 mm. In another example, $0.3(D_1) \leq (D_2) \leq 0.45(D_1)$, in which case, with the bore diameter ($D_1$) at about 130 mm, the wrist pin diameter can range from about 39 mm to about 58.5 mm.

Given a typical clearance between the bore surface and the outer surface of the tubular body of the piston 230, the outer diameter of the tubular body of the piston can serve as the cylinder bore diameter ($D_1$). For example, given a clearance of about 170 microns between a cylinder bore with a diameter of about 130 mm and the outer surface of the tubular body of the piston 230, the outer diameter of the tubular body (about 129.830 mm) can be used to specify the size of the biaxial wrist pin diameter according to FIG. 5.

The biaxial wrist pin 232 can comprise a generally cylindrical piece with a plurality of axially-spaced, eccentrically-disposed journal segments as illustrated in FIG. 5. The wristpin diameter ($D_2$) is constrained to be less than one half of the cylinder bore diameter ($D_1$), such that ($D_2$)<0.5 ($D_1$). The wristpin diameter ($D_2$) can be determined by any one of the outside diameter of the J1 journal segment, the outside diameter of either of the J2 journal segments, or the inside diameter of the wrist pin bore 221. Alternatively, the wristpin diameter ($D_2$) can be determined by any one of the inside diameters defined by the arcuate shapes of the surface segments J1' and J2' (seen in FIG. 5).

The J1 journal segment has a width ($W_{J1}$) and each of the J2 journal segments has a width ($W_{J2}$). The biaxial bearing has a width ($W_{bearing}$), in which ($W_{bearing}$)=($W_{J1}$)+($W_{J2}$)+($W_{J2}$). The width of the J1 journal segment is constrained to be 40% or less than the width of the biaxial bearing; that is, ($W_{J1}$)≤$0.4(W_{bearing})$. More specifically, $0.33(W_{bearing}) \leq (W_{J1}) \leq 0.4(W_{bearing})$. In an example, ($W_{J1}$)=($W_{J2}$)=($W_{J2}$); that is to say, each of the journal segments occupies about ⅓ of the of the width of the biaxial bearing. In another example, no journal segment has a width exceeding 40% of the width of the biaxial bearing. In another example, all journal segments are substantially equal in width.

The scope of patent protection afforded the novel apparatus, systems, and methods described and illustrated herein may suitably comprise, consist of, or consist essentially of a piston configuration for an opposed-piston engine that incorporates the functionality of a wrist pin carrier into other parts of the piston body. Further, the novel apparatus, systems, and methods disclosed and illustrated herein may suitably be practiced in the absence of any element or step which is not specifically disclosed in the specification, illustrated in the drawings, and/or exemplified in the embodiments of this application. Moreover, although the invention has been described with reference to the presently preferred embodiment, it should be understood that various modifications can be made without departing from the spirit of the invention. Accordingly, the invention is limited only by the following claims.

The invention claimed is:

1. A piston apparatus, comprising:
   a cylindrical piston body configured to slide in an opposed-piston, internal combustion engine cylinder having a bore diameter ($D_1$); and,
   the piston body including a biaxial bearing structure configured to define a biaxial wrist pin diameter ($D_2$); wherein, $D_2 < 0.5 D_1$.

2. The piston apparatus of claim 1, in which the biaxial bearing structure comprises a biaxial bearing surface with at least one bearing surface segment defining a first axis and at least a second bearing surface segment defining a second axis parallel to the first axis.

3. The piston apparatus of claim 1, in which the biaxial bearing structure comprises a biaxial wrist pin with at least one wrist pin journal segment defining a first axis and at least a second wrist pin journal segment defining a second axis parallel to the first axis.

4. The piston apparatus of claim 1, in which the bore diameter ($D_1$) comprises a cylinder bore diameter, a cylinder liner diameter, or a piston diameter.

5. The piston apparatus of claim 1, in which the biaxial wrist pin diameter ($D_2$) is measured as a wrist pin bore diameter, a first wrist pin journal segment diameter, a second wrist pin journal segment diameter, a first wrist pin bearing surface segment diameter, or a second wrist pin bearing surface segment diameter.

6. The piston apparatus of claim 1, wherein $0.3(D_1) \leq (D_2) \leq 0.45 (D_1)$.

7. The piston apparatus of claim 6, in which the biaxial bearing structure comprises a biaxial bearing surface with at least one bearing surface segment defining a first axis and at least a second bearing surface segment defining a second axis parallel to the first axis.

8. The piston apparatus of claim 7, in which the biaxial bearing structure comprises a biaxial wrist pin with at least one wrist pin surface segment defining a first axis and at least a second wrist pin surface segment defining a second axis parallel to the first axis.

9. The piston apparatus of claim 1, in which in which the biaxial bearing structure comprises a biaxial wrist pin with a plurality of wrist pin journal segments occupying a biaxial bearing width, in which no journal segment has a width exceeding 40% of the biaxial bearing width.

10. The piston apparatus of claim 9, in which the biaxial wrist pin with at least one wrist pin journal segment defining a first axis and at least a second wrist pin journal segment defining a second axis parallel to the first axis.

11. The piston apparatus of claim 9, in which the bore diameter ($D_1$) comprises a cylinder bore diameter, a cylinder liner diameter, or a piston diameter.

12. The piston apparatus of claim 9, in which the diameter ($D_2$) is measured as a wrist pin bore diameter, a first wrist pin journal segment diameter, a second wrist pin journal segment diameter, a first wrist pin bearing surface segment diameter, or a second wrist pin bearing surface segment diameter.

13. The piston apparatus of claim 9, wherein $0.3(D_1) \leq (D_2) \leq 0.45(D_1)$.

14. A piston apparatus, comprising:
   a generally cylindrical piston body configured to slide in an opposed-piston, internal combustion engine cylinder; and,
   a biaxial bearing structure comprising a biaxial wrist pin with a plurality of wrist pin journal segments defining a biaxial bearing width, in which no wrist pin journal segment has a width exceeding 40% of the biaxial bearing width.

15. The piston apparatus of claim 14, in which the biaxial wrist pin comprises at least one wrist pin journal segment defining a first axis and at least a second wrist pin journal segment defining a second axis parallel to the first axis.

16. The piston apparatus of claim 14, in which the biaxial bearing structure further comprises a biaxial bearing surface with at least one bearing surface segment defining a first axis and at least a second bearing surface segment defining a second axis parallel to the first axis.

17. The piston apparatus of claim 14, in which in which the wrist pin journal segments are substantially equal in width.

18. A piston apparatus, comprising:
   a piston body configured to slide in an opposed-piston, internal combustion engine cylinder;
   a biaxial bearing structure comprising a biaxial wrist pin with a plurality of wrist pin journal segments, each journal segment configured with a respective width, a sum of the respective widths defining a biaxial bearing width, in which no wrist pin journal segment has a width exceeding 40% of the biaxial bearing width;
   the opposed-piston engine cylinder having a bore diameter ($D_1$); and, the piston body including a biaxial bearing structure configured to define a biaxial wrist pin diameter ($D_2$);
   wherein, $D_2 < 0.5 D_1$.

19. The piston apparatus of claim 18, in which the biaxial wrist pin comprises at least one wrist pin journal segment defining a first axis and at least a second wrist pin journal segment defining a second axis parallel to the first axis.

20. The piston apparatus of claim 18, in which the biaxial bearing structure further comprises a biaxial bearing surface with at least one bearing surface segment defining a first axis and at least a second bearing surface segment defining a second axis parallel to the first axis.

21. The piston apparatus of claim 18, in which in which the wrist pin journal segments are substantially equal in width.

22. The piston apparatus of claim 18, in which the bore diameter ($D_1$) comprises a cylinder bore diameter, a cylinder liner diameter, or a piston diameter.

23. The piston apparatus of claim 18, in which the biaxial wrist pin diameter ($D_2$) is measured as a wrist pin bore diameter, a first wrist pin journal segment diameter, a second wrist pin journal segment diameter, a first wrist pin bearing surface segment diameter, or a second wrist pin bearing surface segment diameter.

24. The piston apparatus of claim 18, wherein $0.3(D_1) \leq (D_2) \leq 0.45(D_1)$.

* * * * *